(12) United States Patent
Rothrock (10) Patent No.: US 7,174,320 B2
(45) Date of Patent: Feb. 6, 2007

(54) METHOD OF PROVIDING ADAPTIVE SECURITY

(75) Inventor: Lewis V. Rothrock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1016 days.

(21) Appl. No.: 10/116,979

(22) Filed: Apr. 4, 2002

(65) Prior Publication Data

US 2003/0191944 A1 Oct. 9, 2003

(51) Int. Cl.
*G06Q 99/00* (2006.01)

(52) U.S. Cl. ............................. 705/58; 726/4; 713/156; 705/59; 705/57

(58) Field of Classification Search ............... 705/58, 705/57, 59; 726/4; 713/156
See application file for complete search history.

(56) References Cited

U.S. PATENT DOCUMENTS

2003/0084306 A1* 5/2003 Abburi et al. .............. 713/188

FOREIGN PATENT DOCUMENTS

JP 2002150002 A * 5/2002

* cited by examiner

*Primary Examiner*—Elisca Pierre Eddy
(74) *Attorney, Agent, or Firm*—Steven P. Skabrat (57) ABSTRACT

Providing adaptive security for access to content on a system may be accomplished by determining if a user has rights to access the content according to a content license associated with the content, and when the user has rights to play the content, performing the following actions. The system reads a data structure in the content license defining at least one security factor ID and an associated factor value, sets a security factor value for a security factor, the security factor corresponding to the security factor ID, to the associated factor value from the data structure, allows access to the content, and performs security processing by the system at a level based at least in part on the security factor value. In one embodiment, the security factor IDs and associated factor values are set by a content owner or distributor at the time of manufacturing or distributing the content.

27 Claims, 7 Drawing Sheets

METHOD OF PROVIDING ADAPTIVE SECURITY

BACKGROUND

1. Field

The present invention relates generally to digital content protection in computer and consumer electronics systems and, more specifically, to adapting security levels for program modules to a desired performance attribute or to other requirements.

2. Description

The personal computer (PC) platform is an open and accessible computer architecture. However, the openness of the PC means that it is a fundamentally insecure computing platform. Both the hardware and software can be accessed for observation and modification. This openness allows malicious users and programs to observe and to modify executing code, perhaps with the aid of software tools such as debuggers and system diagnostic tools. Despite these risks, there are classes of operations that must be performed securely on the fundamentally insecure PC platform. These are applications where the basic integrity of the operation must be assumed, or at least verified, to be reliable. Examples of such operations include financial transactions and other electronic commerce, unattended access authorization, and digital content management.

For content providers, countering the threat of digital piracy on the PC requires new software that is resistant to attacks by a malicious user. In this scenario, the malicious user may wish to tamper with or replace particular components of the software in order to gain unauthorized access to digital content or to make unauthorized reproductions. A cryptosystem based on cryptographic methods employed in conjunction with the software may be used to help protect the content owner's rights. Content may be encrypted to provide some measure of protection, but the software accessing the decrypted content during playback is still vulnerable to attack.

Digital content is usually accessed by a player application and associated components running on the PC or another electronic device. Players are typically not designed with security in mind. If a level of security is, however, set for a player application, it is usually the same level for all instances of the player application. Additionally, content may be protected by a certain level of security by the content provider, but that level of security is typically the same for all copies of the content.

Although known techniques may generally provide an adequate level of security, improvements can still be made to further secure software and content, and stay one step ahead of digital content pirates. What is needed is a method that will allow a player or other application program on the fundamentally insecure, open PC to apply different levels of security to access to content, whereby the security level may be set by a content provider or distributor prior to distribution of the content.

BRIEF DESCRIPTION OF THE DRAWINGS

The features and advantages of the present invention will become apparent from the following detailed description of the present invention in which.

DETAILED DESCRIPTION

An embodiment of the present invention is a method for providing adaptable security levels for selected content that are interpreted and implemented by a security system. In this invention, a content provider or authorized content distributor may select, when the content is manufactured or distributed, a level of security to be provided for access to content after distribution. This selectable level of security may be included as a parameterized security factor in a content license accompanying the content when the content is distributed. When a player application and associated components access the content, the security level specified in the security factor by the content provider or distributor may be applied by a security system to regulate access to the content or affect security processing protecting such access. During selection of the security level, a content provider may take into account the performance requirements or other attributes of user systems implementing different levels of security, thereby balancing security interests with the goal of providing a good user experience during content playback.

As used herein, a program module is any identifiable portion of computer program code or any sequence of programming instructions in any programming language. In one embodiment, program modules may comprise at least one of a player application for playing digital content, a plug-in module having a coder/decoder (codec), and an agent for, at least in part, providing security. In other embodiments, a program module may comprise one or more other application programs. Generally, a signed binary description filed (SBDF) may be a file comprising, at least in part, a binary description of the integrity of at least one program module.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
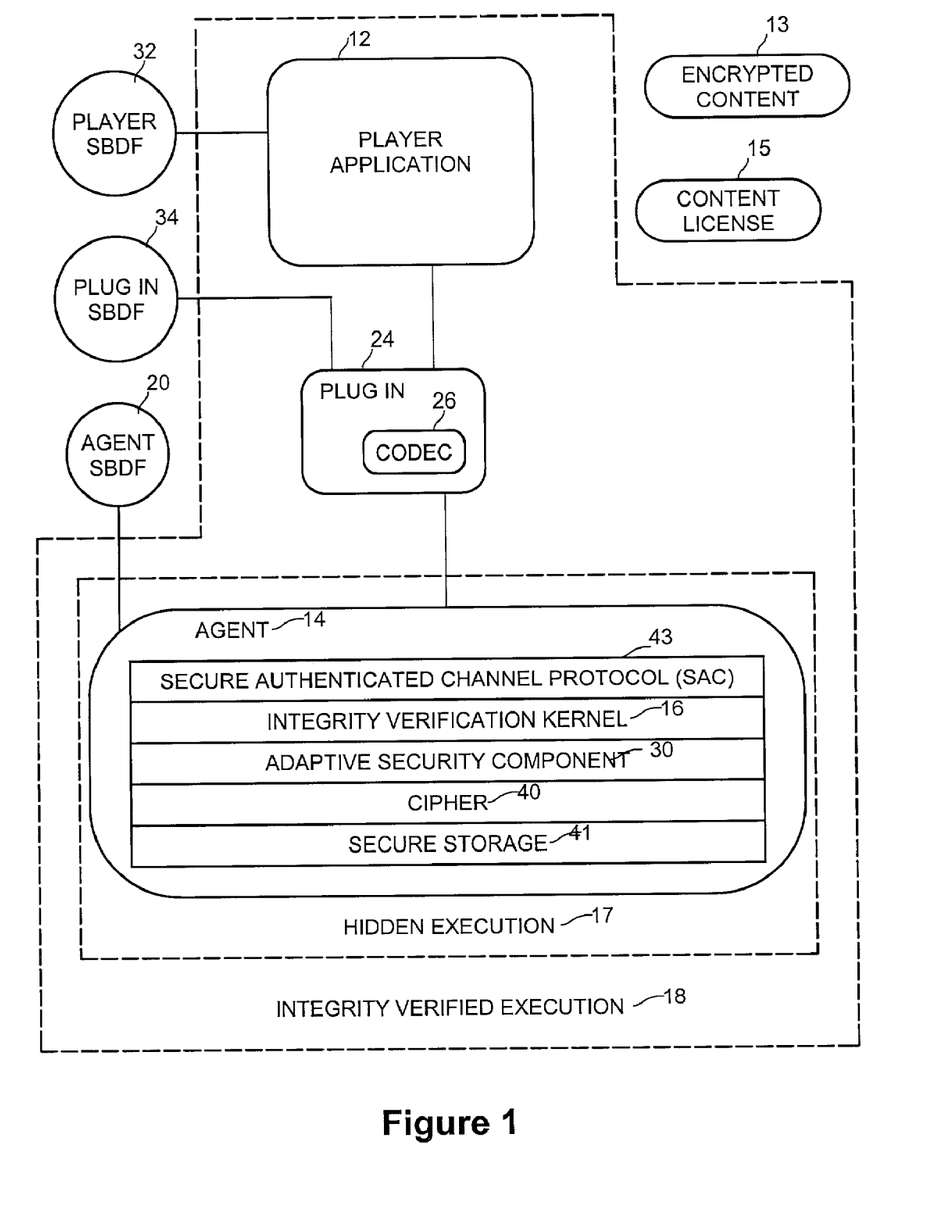
FIG. 1 is a diagram of a system according to an embodiment of the present invention.

FIG. 1 is a diagram of a secure system 10 according to an embodiment of the present invention. Known techniques may be used to securely link a first program module called a player application 12 with a second program module, called an agent 14, as described in U.S. Pat. No. 6,105,137, entitled "Method and Apparatus for Integrity Verification, Authentication, and Secure Linkage of Software Modules." In this example, the player may be an application program to play digital content such as audio, video, still images, music, movies, multimedia, and so on, and the agent may be a software component to provide security services for the player. Player 12 uses a security module within the agent called an Integrity Verification Kernel (IVK) 16, to verify the integrity of the player. In one embodiment, agent 14 may be made tamper resistant to further protect the agent from attempts by malicious users to tamper with or observe its execution and/or its interaction with the player. The use of tamper resistance techniques help to provide a protected environment for operation of the player.

Tamper resistant software is software that has been made resistant to observation and modification. It can be trusted, within certain bounds, to operate as intended even in the presence of a malicious attack on it. Tamper resistant software is position independent and does not require relocation in memory. Therefore, tamper resistant software does not have to run in the same address space or processor in which it was created. In one embodiment, such software is generated by using a tamper resistant compiler (not shown). The tamper resistant compiler is a compiler that, when applied to a well-prepared software module, replaces the plain-text source code compiler generated image with a new image that is obfuscated. This self-decrypting software will only execute properly if no part of the image has been altered from the time it was compiled by the tamper resistant compiler. The tamper resistant compiler is a software approach towards providing kernels of software (e.g., the agent) with the ability to run in a "hidden" execution mode 17. Attempts to decipher what the software is actually doing, or modifications made to the software, will result in the complete failure of the kernels (i.e., it will not decrypt properly).

Player 12 may be associated with an Integrity Verification Kernel (IVK) 16 within agent 14. An IVK is software that verifies that the "fingerprint" of an inmemory program image (e.g., the code image of the player) corresponds to the data within a supplied digital signature (contained in player SBDF 32). This procedure authenticates the program image. It provides a robust mechanism for detecting changes made to executing software, where those changes might be caused by transmission errors or malicious attacks on the software. Any unauthorized change to the software results in a failure in the verification process. If the verification process fails, then the player may be inhibited from executing. For example, if the program being verified is a digital content player application and the player's integrity is detected by the IVK to be compromised, then the player will not decrypt and play the content. IVKs for tamper resistant software are constructed to perform self-checks of object code, bilateral authentication of partner modules, and checks on local and remote data to verify the integrity of a software module. The IVK is self-modifying, self-decrypting, and may be installation unique.

Two intra-process software modules (e.g., the player and the agent) requiring to communicate with each other in an authenticated manner can establish that the module one is calling is indeed the one it is expecting by verifying the digital signature of the called module using a predetermined "root" key. This process is called bilateral authentication. In embodiments of the present invention, IVK 16 may be used to verify the integrity of the player 12. Detailed methods for creating tamper resistant modules and providing integrity verification processing with IVKs and bilateral authentication are described in U.S. Pat. No. 5,892,899, entitled "Tamper Resistant Methods and Apparatus", which is commonly assigned to the same entity as the present invention.

In embodiments of the present invention, player 12 and agent 14 operate within an environment of "integrity verified execution" 18. By using the techniques described above, the agent may be tamper resistant and the integrity of the player may be continually verified by the agent during player operation.

Processing by the system shown in FIG. 1 may be performed as follows. An operating system (OS) loads and starts execution of a main application program. In the example shown in FIG. 1, the main application program is a player application for playing and/or downloading music, video, or other multimedia content included in encrypted content 13 according to the terms of content license 15. At this point, one or more static software modules may be loaded into memory along with the main player executable files to pre-resolve path information of dynamic modules. This may, for example, be achieved on the basis of information in a component database (not shown). In one embodiment, the static components and the main player process provide interfaces to allow a user to interact with the main process. The interaction generally requires the user's identity to be authenticated and the modules related to the main process to be verified and/or linked together in a secure manner. When the user clicks on an action for the player or demands that an action be performed, the player loads specific object modules that allow the action to be performed. The object modules may, for example, be a program module within the player, an agent, a plug-in 24, or other code. In the context of a player, actions that a user may wish to perform may be playing a song, loading a song to a portable device, playing a video, converting digital content to another format, and so on. In the example shown in FIG. 1, performing a requested action may require loading different object modules, such as plug-in 24 and agent 14, for example. In other embodiments, other modules may be invoked in place of or in combination with the modules shown in FIG. 1. Plug-in 24 may be loaded and executed to perform a particular function, such as coding and decoding of data in a codec 26, for example.

After the player and any other required modules are loaded by the OS, an import table (not shown) within the player application has been updated by the OS loader to include addresses of calls to OS services and other support modules used by the player.

Cipher 40 may be used to decrypt encrypted secure functions. Secure storage 41 may be used to store secret information while agent 14 is executing. Secure authenticated channel (SAC) protocol 43 may be used to communicate with other trusted endpoints of a communications path (such as a secure server responsible for serving secure music distributions or a secure hardware player to which a user may download music, for example). The SAC protocol may be used to verify the identity of another communicating module as one that is trusted, and to transmit keys or requests for service.

Figure 2:
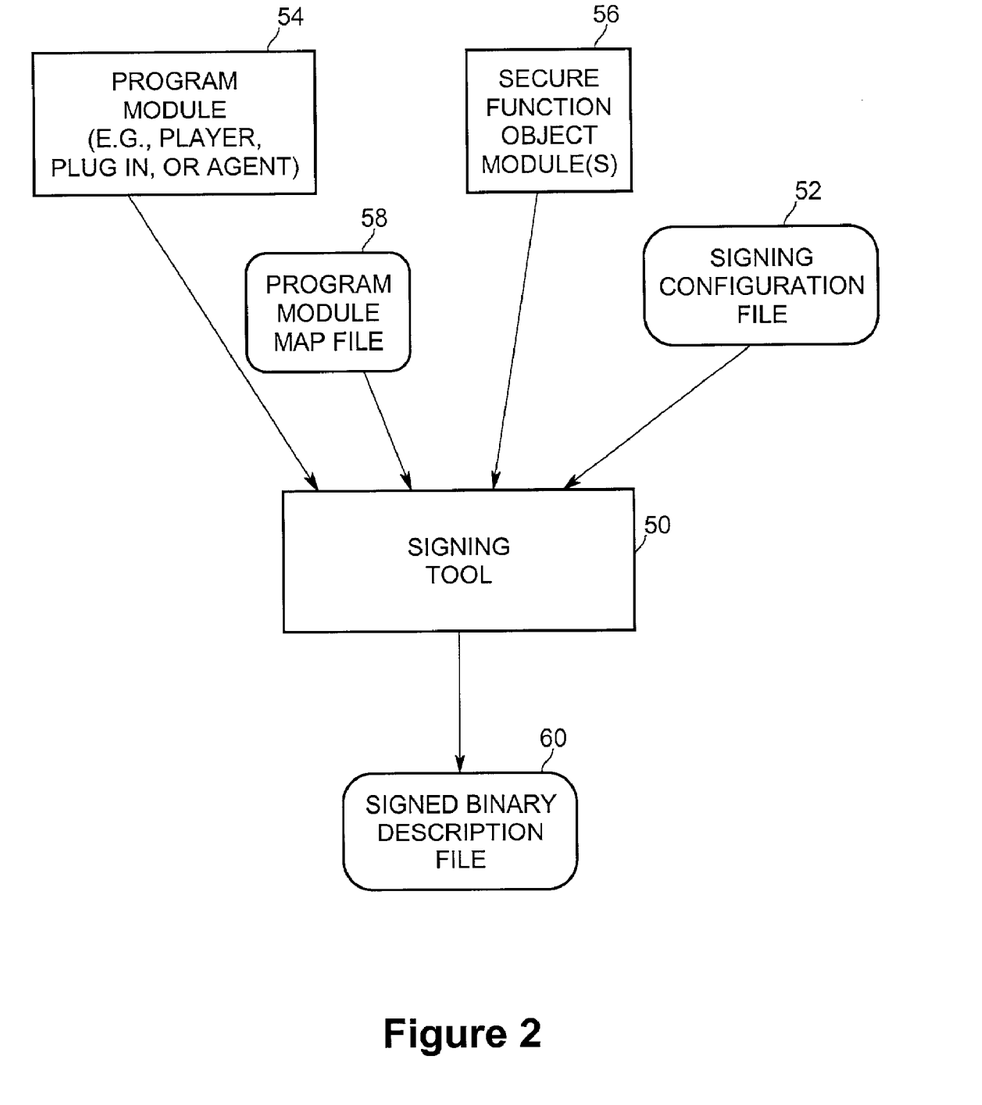
FIG. 2 is a diagram describing input data to and output data from a signing tool according to an embodiment of the present invention.

Each of the program modules shown, player 12, plug-in 24, and agent 14, have an associated signed binary description file (SBDF), shown as player SBDF 32, Plug-in SBDF 34, and Agent SBDF 20, respectively. A module's SBDF provides the information required to verify its integrity. Multiple SBDFs may be combined into a single SBDF, as described in pending patent application entitled "System and Method for Verifying Integrity of System with Multiple Components", Ser. No. 09/967,738, and assigned to the same entity as the present invention. A SBDF may be created by a signing tool, which accepts information about a program module (such as player, agent, and plug-in), and identification information from the program module and the IVK, and digitally signs the file. FIG. 2 shows the input data to and output data from a signing tool 50 according to one embodiment of the present invention. One suitable signing tool for this purpose is described in U.S. Pat. No. 6,105,137, entitled "Method and Apparatus for Integrity Verification, Authentication, and Secure Linkage of Software Modules." In one implementation the signing tool may be a signed binary description file (SBDF) manager program that generates an SBDF. For example, the C programming language may be used to implement the signing tool, with the tool running as one or more executable files or dynamic modules, such as DLL files or shared files. The terminology of the dynamic modules may vary depending on the operating system environment, including, but not limited to, Microsoft Windows, Unix, Linux and Apple Macintosh. In other embodiments, other programming languages, a hardware equivalent, or other formats may be used for implementing the signing tool.

In one embodiment, the signing tool may read a signing configuration file 52 specified in a command line parameter when invoking execution of the signing tool by a software developer or other entity. The signing configuration file comprises information for generating the SBDF, how the modules are to be signed, key information for signing and encrypting, and so on. This information may include information such as the number of program modules, unique identification names of program modules, file paths to program modules and/or secure function object modules, the type of hash algorithm used, a relocation table, passwords, and other program module information.

Other inputs to the signing tool include zero or more program modules 54, secure function object modules 56, and a program module map file 58. Program modules may be in object code format as output from a compiler. Program modules may be, for example, a player, a plug-in, and an agent. Program module map file may be a file generated when producing an executable file or a dynamic module that lists all functions and variable offsets in the binary. Other information in the map file may include additional compilation data referring to such things as symbols and tables, for example.

The signing tool takes the program modules and the program module map file and operates on them according to the instructions contained in the signing configuration file to generate SBDF 60. The SBDF thus contains, at least in part, object code for functions to be securely loaded. The SBDFs may be considered to be a license for the player (when the player application program and associated program modules are built, the SBDF is also built). Hence, a software developer or other development entity sets up the SBDFs for protecting identified functions at design time. Then, at run-time when the player has been loaded and is executing, the player and securely loaded functions may be protected.

Figure 3:
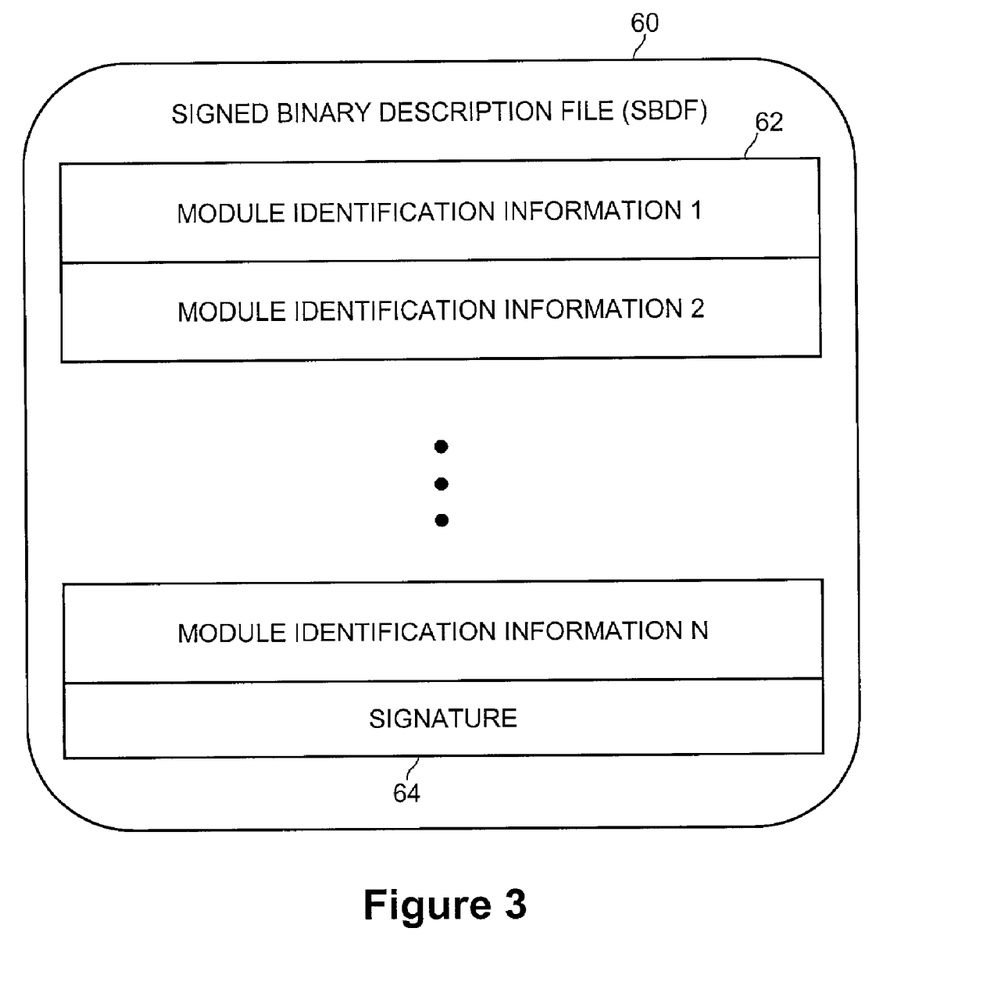
FIG. 3 is a diagram of a signed binary description file (SBDF) according to an embodiment of the present invention.

FIG. 3 is a diagram of a signed binary description file (SBDF) according to an embodiment of the present invention. FIG. 3 shows one embodiment of the format of a SBDF, although in other embodiments, other fields may be added or deleted without limiting the scope of the present invention. In one embodiment, the SBDF may include a plurality of records, one per program module. Module identification information field 62 identifies a program module. Signature 64 comprises the digital signature of the contents of the SBDF.

Figure 4:
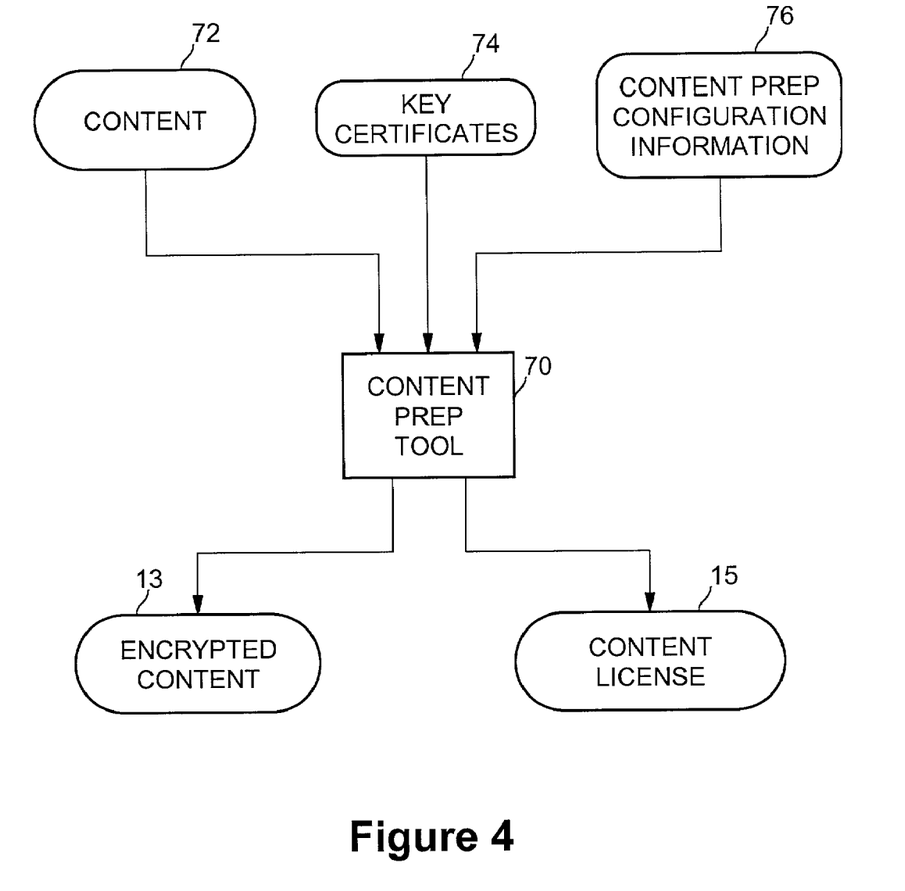
FIG. 4 is a diagram describing input data to and output data from a content prep tool.

FIG. 4 is a diagram describing input data to and output data from a content prep tool. A content provider or distributor may execute content prep tool 70 to generate encrypted content 13 and content license 15 according to at least one embodiment of the present invention. Encrypted content may be generated from content 72 by encrypting the content using one or more cryptographic keys contained in key certificates 74. In one embodiment, a set of predefined information that relates to one or more of the program modules and content may be stored in a data structure called content license 15. A content license may afford a user rights to use a particular piece of content. In one implementation, program module license information within module identification information 62 of a SBDF may be linked to the content license through a trusted root key found in the content license. In other implementations, other methods may be used to link the program module license within module identification information with the content license.

The trusted root key information may be obtained from key certificates 74. The root key may be used to verify the signature of the program module license. If the signature is valid, then the content license authorizes the set of program modules identified in the program module license to be used, provided that the set of modules has not been tampered with. When a program, such as an agent or player application, needs information that relates to program modules, the program reads the content license to retrieve the needed information. Intrinsically, the program module knows the type of information to retrieve. In one embodiment, the information retrieved comprises user rights to use the player application and associated program modules to access the content. Content prep configuration information 76 comprises data necessary for generating the encrypted content and content license, such as selectable security parameters, file pathnames to content 72 and key certificates 74, and content rights. Content rights may include parameters such as the "number of plays", "number of copies allowed", and so on. In other embodiments, the configuration information may be provided to the content prep tool using an interactive form (such as a web application, for example). Security parameters may include settings for a given level of security for accessing the content.

Figure 5:
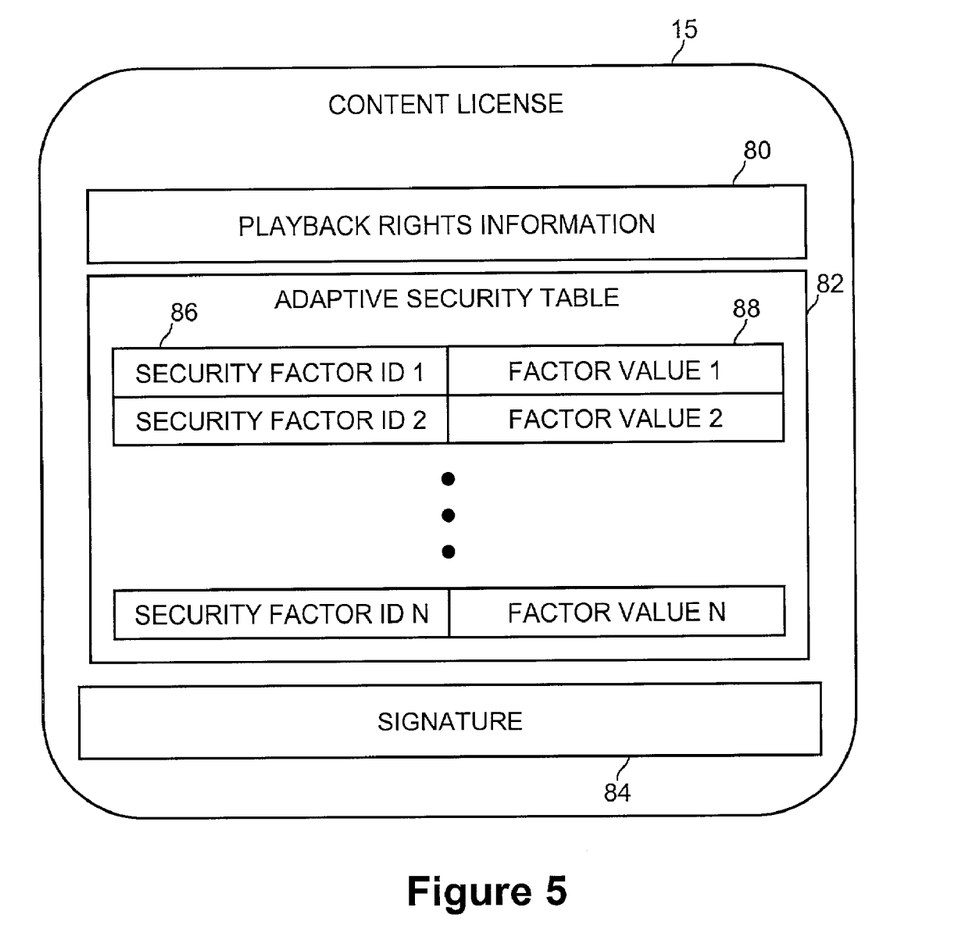
FIG. 5 is a diagram of a content license according to an embodiment of the present invention.

FIG. 5 is a diagram of a content license according to an embodiment of the present invention. Content license includes playback rights information 80, a data structure called an adaptive security table 82, and a digital signature 84. A content license may be specific to a particular content title or work. Playback rights information 80 may include information for use by a security system, such as a copy count (CC) allowed for the content, number of times playing of the content is allowed, whether the content may be copied to a portable device or limited to local playback, an expiration date for authorized playback, and so on. Signature 84 comprises the digital signature of the contents of the content license, thereby protecting the content license from tampering.

Adaptive security table 82 includes one or more entries. Each entry includes at least a security factor identifier (ID) 86 and corresponding factor value 88. Each security factor references a particular security defense or feature that may be provided by the security system operating on the user's machine (e.g., the agent 14). Generally, a security defense or feature may be any mechanism used by system 10 to protect content. In one specific, non-limiting example, the security factor may be the rate in bytes per second (bps) that IVK 16 cross checks program module code. In another specific, non-limiting example, the security factor may be the frequency at which integrity verification may be performed. The security factor IDs are meaningful to the agent. By examining the security factor IDs, the agent may set a selected security factor for the system in secure storage corresponding to the security factor ID to the value or setting specified by the factor value 88. For example, if the content is being played back on a machine that has a less powerful processor, in order to provide a good user experience during content playback the system may require a lower level of a selected security feature (since a higher level of the selected security feature may have a negative impact on the overall throughput of the user's machine, thereby affecting content rendering speed). A security factor ID and associated factor value may be set in the content license to reflect this arrangement. If the user's machine has a more powerful processor, the system may require a higher level of a selected security feature (since the user's machine can handle the load necessary to provide the better security). Since the level of a particular security feature may be set by the content owner or distributor at the time of content manufacture, and the security feature may be read by the playback system and selectively and individually set, an enhanced, more flexible, and scaleable security control mechanism may be provided. In this scheme, the content owner may select the security level instead of the device manufacturer (e.g., maker of the PC or other consumer electronics device).

With embodiments of the present invention, the quality of sound during content rendering (depending on processor speed of the user's machine) may be balanced against the security needs of the content owner. Hence, tuning of the security level for a range of user platforms may now be accomplished. With the present invention, the device reading the content license determines the level of security provided for accessing the content. The agent running on the user's machine can decide, based on examination of the content license, the appropriate level of security. Since the adaptive security table may be encrypted and/or protected by a digital signature, and only accessed within hidden execution environment 17 and integrity verified execution environment 18, overall system security may be enhanced. In some cases, the content owner may select the level of security commensurate with the value of the content being distributed. Note that although the content owners may select a security level setting for a specific security factor, the content owners may not be aware of the actual details of how the security factor is implemented by the agent. Thus, the security details may be kept secret by a developer of the agent.

Figure 6:
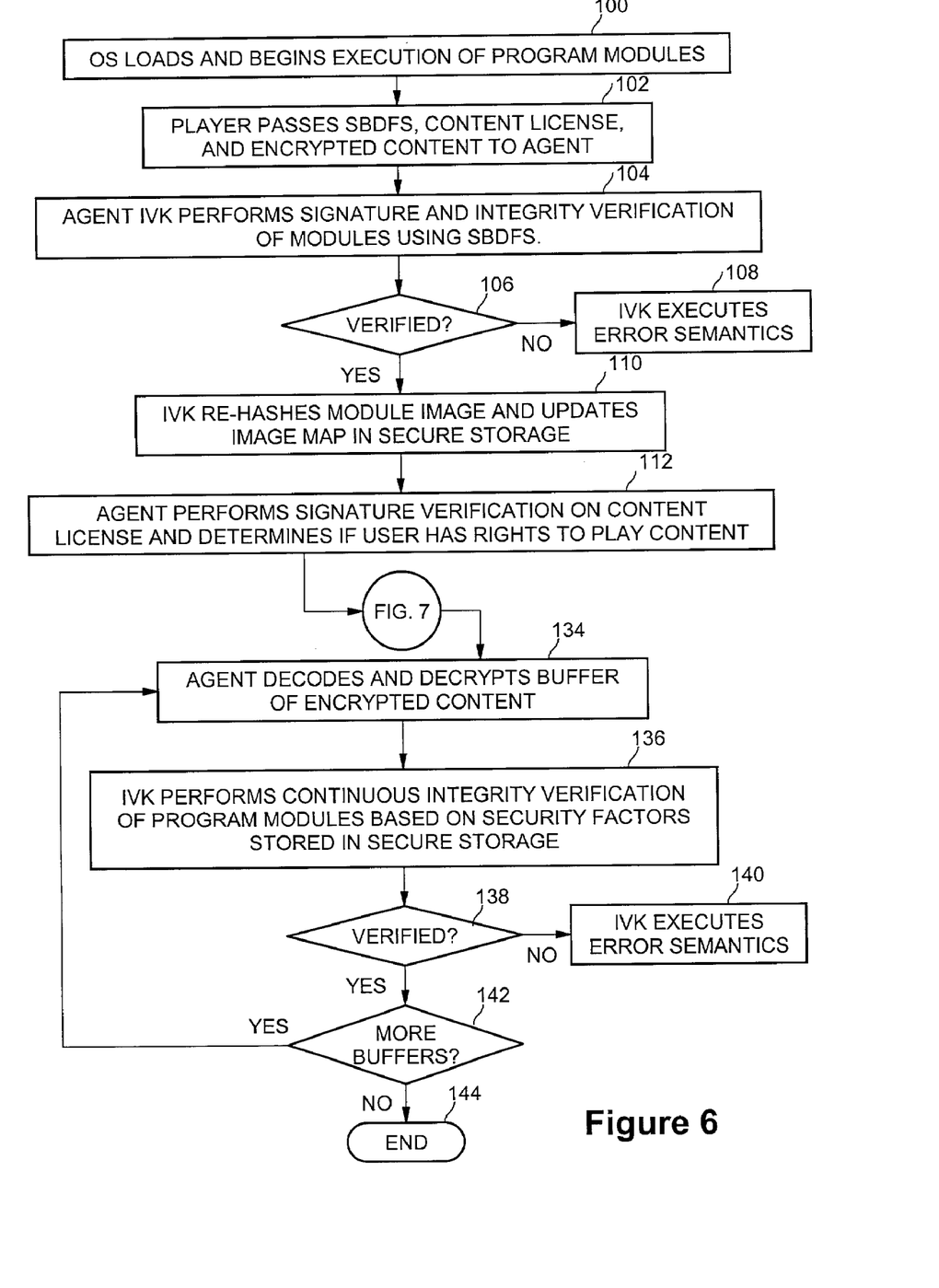
FIGS. 6 and 7 are flow diagrams of adaptive security processing according to an embodiment of the present invention.
Figure 7:
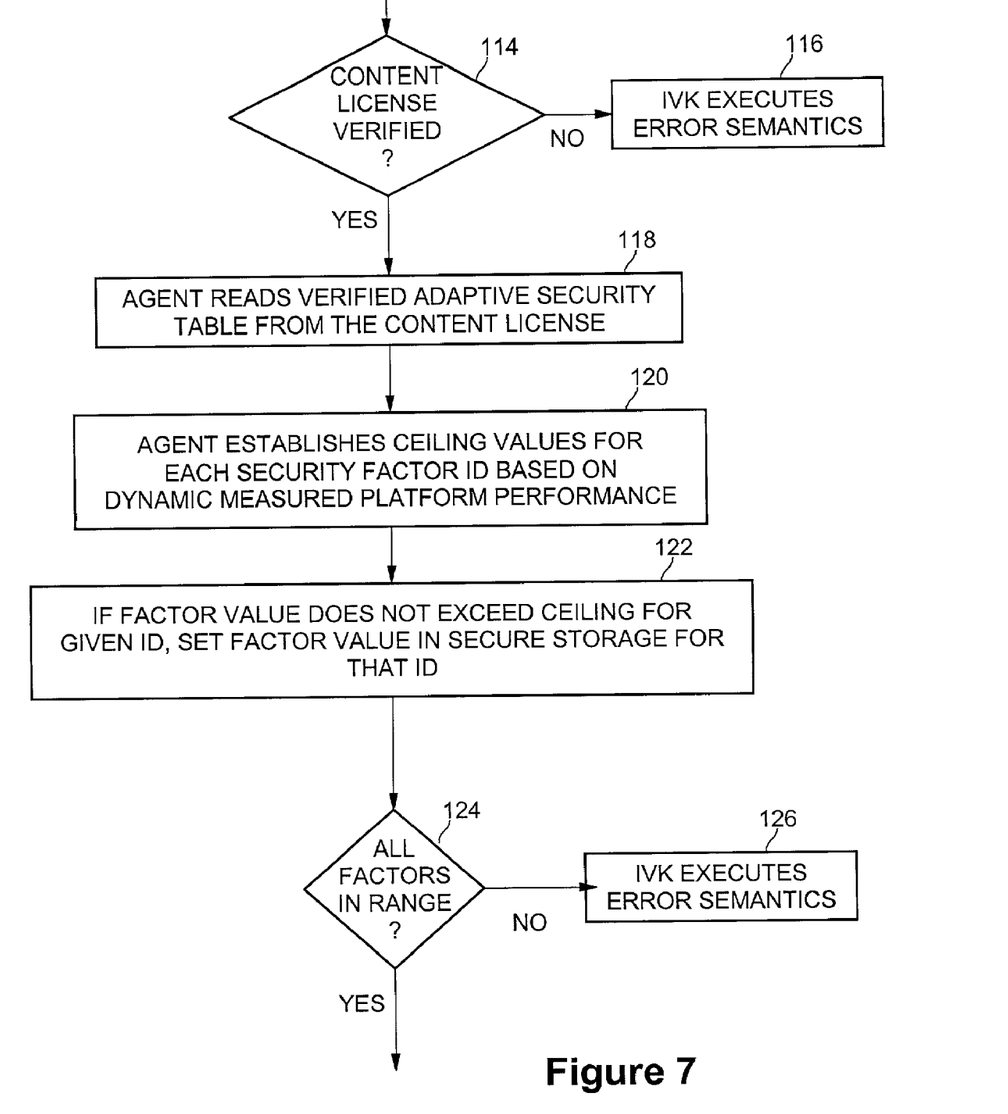

FIGS. 6 and 7 are flow diagrams of adaptive security processing according to an embodiment of the present invention. Once program modules as described above have been signed and distributed along with encrypted digital content 13 and a content license 15 to a client computer system, the protected playback environment as shown in FIG. 1 may be loaded by the OS. When the user presses the "play" button, for example, to play digital content, the actions of FIGS. 6 and 7 may be performed. At block 100, the OS loads and begins execution of program modules. For example, the player 12 may be loaded and started, if it is not already executing. Once the player is loaded and started, playing digital content may require use of a plug-in 24 having a codec 26. When the player is executing, agent 14 may also be loaded and executed, in order to provide security for the player and associated modules. The agent may control access to premium digital content using the content license. In some cases, some capabilities of the player may available, but before the agent allows access to the content, the modules must first be verified.

At block 102, the player passes SBDFs for the relevant modules (player, plug-in, and agent), the content license, and encrypted content to the agent. The encrypted content may comprise one or more buffers of data. At block 104, the IVK within the agent performs signature and integrity verification of all modules using the SBDFs received during block 102. The IVK determines if the player, plug-in, and agent are as expected and have not been tampered with. At block 106, the IVK determines if the modules have been verified. If the modules do not verify for any reason, the IVK may execute error semantics at block 108 to handle the error. In some embodiments, processing of the player may then be terminated.

If the modules are verified, processing continues with block 110. At block 110, the IVK re-hashes the player image, including where target edits may have been applied to entries in the import table contained within the player application. The hash of one or more secure functions may be included in the new image hash. An image map in secure storage 41 may be updated so that continuous verification by the IVK will now verify that the player's import table has not been "hooked" by an attacker. At block 112, the agent performs signature verification on the content license and determines if the user has the rights to play the content. Processing then proceeds with FIG. 7.

At block 114 of FIG. 7, the agent determines if the content license is verified. If the content license does not verify for any reason, the IVK within the agent may execute error semantics at block 114 to handle the error. In some embodiments, processing of the player may then be terminated. If the content license is verified, processing continues with block 118. At this block, the agent reads the verified adaptive security table from the content license. At block 120, in one embodiment, the agent establishes ceiling values for each security factor ID based on dynamic measured platform performance. A ceiling value may define an acceptable range for each security factor at run-time. For example, a ceiling value for a given security factor ID may be set based on processor speed. At block 122, if the specified factor value from an entry in the adaptive security table does not exceed the ceiling value for the given security factor ID, the factor value may be stored in secure storage in an entry for a security factor corresponding to the security factor ID. If, at block 124, all specified factor values are within range, processing continues with block 134 on FIG. 6. Otherwise, if a factor is out of range, IVK executes error semantics at block 126.

Returning back to FIG. 6, in one embodiment, at block 134 the agent may decode and decrypt a buffer of encrypted digital content as part of the playing of the content by the player. In other embodiments, the agent and/or the player application may perform other operations on the content. Since the security factors have been set as described in FIG. 7, the system may now perform security processing according to one or more of the security factors. In one embodiment shown in FIG. 6, at block 136 the IVK performs continuous integrity verification of program modules using the updated hashing information in secure storage 41 according to the security factors specified by the adaptive security table of the content license. In other embodiments, other security processing may be performed by modules of the system according to the security factors. The number of security factors in the content license and associated security functions executed by the system may be implementation dependent. At block 138, if the IVK determines that the program modules are not verified, the IVK executes error semantics at block 140. Otherwise, the program modules are verified and processing continues at block 142. At this block, if there are more content buffers to process, processing continues with the next buffer at block 134, while continuous integrity verification also continues. When there are no more content buffers to process, processing ends at block 144.

In the embodiment described above, the security factors are communicated within the content license. In another embodiment, the adaptive security table may be encoded in a token passed in a SAC protocol to the agent.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, set-top boxes, personal digital assistants, portable content rendering devices, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g., compact read only memory (CD-ROM), digital versatile disk (DVD), hard disk, magnetic disk, or similar medium or device, that is readable by a general or special purpose programmable machine for configuring and operating the machine when the storage medium or device is read by the computer to perform the procedures described herein. The system may also be considered to be implemented as a machine-readable or machine accessible storage medium, configured with a program, where the storage medium so configured causes a machine to operate in a specific manner. Other embodiments are within the scope of the following claims.

While the present invention has been described with respect to a limited number of embodiments, those skilled in the art will appreciate numerous modifications and variations. It is intended that the appended claims cover all such modifications and variations as fall within the true spirit and scope of this present invention.

What is claimed is:

1. A method of providing adaptive security for access to content on a system comprising:
    determining if a user has rights to access the content according to a content license associated with the content; and
    when the user has rights to play the content:
        reading a data structure in the content license defining at least one security factor ID and an associated factor value;
        setting a security factor value for a security factor, the security factor corresponding to the security factor ID, to the associated factor value from the data structure;
        establishing a ceiling value for each security factor ID;
        wherein setting the security factor value for the security factor corresponding to the security factor ID to the associated factor value from the data structure comprises setting the security factor value only when the ceiling value is not exceeded by the associated factor value;
        allowing access to the content; and
        performing security processing by the system at a level based at least in part on the security factor value.

2. The method of claim 1, further comprising performing signature verification of the content license prior to determining if the user has rights to access the content.

3. The method of claim 1, wherein the associated factor values are set by at least one of a content owner and an authorized content distributor.

4. The method of claim 1, wherein performing security processing comprises performing continuous integrity verification of program modules accessing the content based at least in part on the security factor value.

5. The method of claim 4, further comprising continuously verifying the integrity of the program modules within an integrity verified execution environment.

6. The method of claim 4, wherein one of the program modules being continuously verified comprises a player application and accessing the content comprises playing the content by the player application.

7. The method of claim 6, further comprising decrypting and decoding the content by the player application.

8. The method of claim 1, further comprising setting the ceiling value based on dynamic measured performance of the system.

9. The method of claim 1, wherein the content license comprises playback rights information, and further comprising accessing the playback rights information in the content license when determining if the user has rights to access the content.

10. The method of claim 1, wherein determining, reading, establishing, setting, allowing and performing occur within a hidden execution mode.

11. The method of claim 1, comprising obtaining the data structure from a token received via a secure authenticated channel (SAC) communication instead of from the content license.

12. The method of claim 1, further comprising storing the security factor value in a secure storage.

13. An article of manufacture comprising: a machine accessible medium having a plurality of machine readable instructions, wherein when the instructions are executed by a processor, the instructions provide for adaptive security for access to content on a system by
    determining if a user has rights to access the content according to a content license associated with the content; and
    when the user has rights to play the content:
        by reading a data structure in the content license defining at least one security factor ID and an associated factor value;
        by setting a security factor value for a security factor, the security factor corresponding to the security factor ID, to the associated factor value from the data structure;
        by establishing a ceiling value for each security factor ID, wherein instructions for setting the security factor value for the security factor corresponding to the security factor ID to the associated factor value from the data structure comprise instructions for setting the security factor value only when the ceiling value is not exceeded by the associated factor value;
        by allowing access to the content; and by performing security processing by the system at a level based at least in part on the security factor value.

14. The article of claim 13, further comprising instructions for performing signature verification of the content license prior to determining if the user has rights to access the content.

15. The article of claim 13, wherein instructions for performing security processing comprise instructions for performing continuous integrity verification of program modules accessing the content based at least in part on the security factor value.

16. The article of claim 15, further comprising instructions for continuously verifying the integrity of the program modules within an integrity verified execution environment.

17. The article of claim 15, wherein one of the program modules being continuously verified comprises a player application and accessing the content comprises playing the content by the player application.

18. The article of claim 17, further comprising instructions for decrypting and decoding the content by the player application.

19. The article of claim 13, further comprising instructions for setting the ceiling value based on dynamic measured performance of the system.

20. The article of claim 13, wherein the content license comprises playback rights information, and further comprising instructions for accessing the playback rights information in the content license when determining if the user has rights to access the content.

21. The article of claim 13, wherein instructions for determining, reading, establishing, setting, allowing and performing are executed within a hidden execution mode.

22. The article of claim 13, further comprising instructions for storing the security factor value in a secure storage.

23. A system for providing adaptive security processing during access to content comprising:
a content license associated with the content, the content license comprising a data structure specifying at least one security factor ID and an associated factor value;
a player application to play the content as permitted by the content license; and
an agent to continuously verify the integrity of the player application, the agent including an adaptive security component to read the at least one security factor ID and an associated factor value, to set a security factor value for a security factor, the security factor corresponding to the security factor ID, to the associated factor value from the data structure, to establish a ceiling value for each security factor ID and set the security factor value for the security factor, corresponding to the security factor ID, to the associated factor value from the data structure only when the ceiling value is not exceeded by the associated factor value, to allow access to the content by the player application, and to perform security processing at a level based at least in part on the security factor value.

24. The system of claim 23, wherein the player application and the agent operate within an integrity verified execution environment.

25. The system of claim 24, wherein the agent operates within a hidden execution mode.

26. The system of claim 23, wherein the agent is tamper resistant.

27. The system of claim 23, wherein the agent sets the ceiling value based on dynamic measured performance of the system.

* * * * *